Dec. 31, 1963 W. D. HENGST 3,115,997
FISHERMAN'S BELT
Filed April 24, 1961
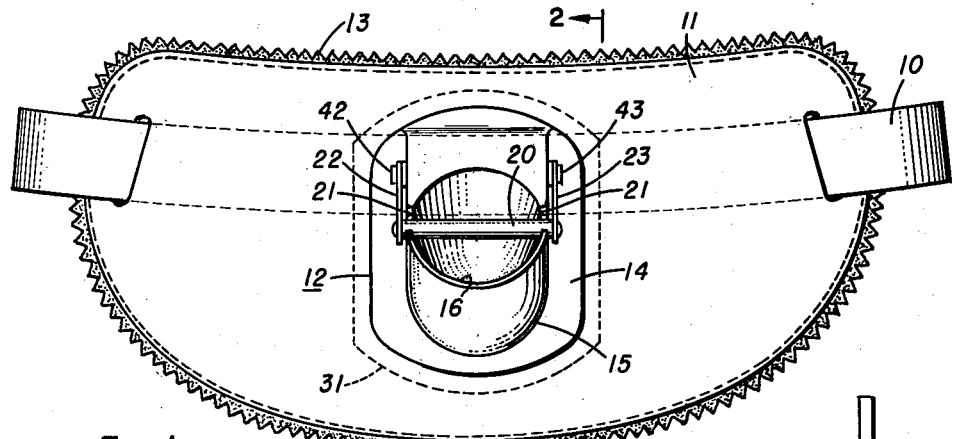
FIG.1
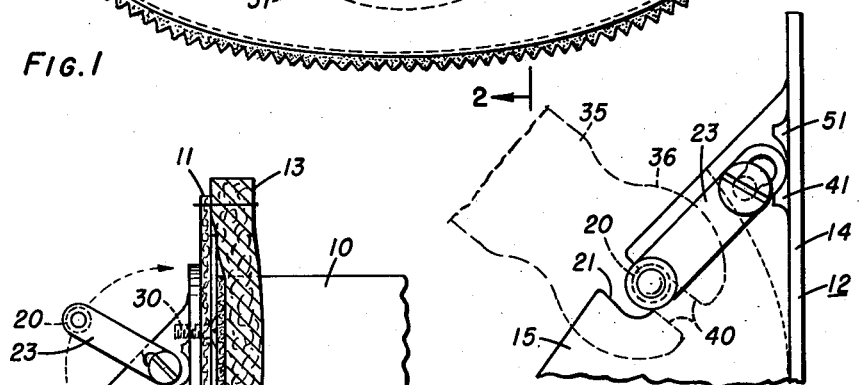
FIG.2
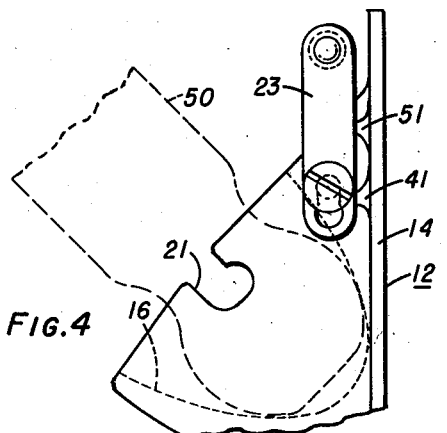
FIG.3
FIG.4
INVENTOR
W. D. Hengst
BY John E. Wagner
ATTORNEY

United States Patent Office 3,115,997
Patented Dec. 31, 1963

3,115,997
FISHERMAN'S BELT
Walter D. Hengst, North Hollywood, Calif.
(P.O. Box 81, Kaweah, Calif.)
Filed Apr. 24, 1961, Ser. No. 104,970
4 Claims. (Cl. 224—5)

This invention relates to fishing equipment and more particularly to fishing rod supporting socket and belt assemblies.

In deep sea fishing a necessary piece of equipment for the fisherman is a belt worn around the lower abdomen with a control socket positioned to hold the butt of the fishing rod. The usual form of socket and belt for use with medium weight fishing tackle is a leather belt carrying a triangular-shaped pad of leather with a leather cup-shaped pocket sewn at the approximate center of the triangle. The fisherman merely rests the butt of the rod in the socket or cup while holding on to the rod and reel handle with his hands.

In fishing for heavier fish, in particular marlin, the mere use of a socket and belt is insufficient in that the forces exerted on the rod by a strike or in play of the fish often cause a twisting of the rod in the fisherman's hands and loss of control. This last problem has been aovided by the use in heavy tackle of a special rod butt of metal, spherical in shape, with a transverse slot through the spherical portion. A special belt and socket is used with this tackle including a socket with a spherical cup and a transverse pin permanently secured to the cup. This combination of butt and socket effectively resists turning of the rod. However, it can be understood that having two types of rod butts necessitate two types of fishing belts.

With this state of the art in mind, it is a general object of this invention to provide a fisherman's universal belt and socket usable with either medium or heavy tackle.

Another object of this invention is to provide such a universal socket which is readily changed from heavy to medium tackle condition without the necessity of removal of any parts or the use of tools.

One further object of this invention is to provide such a socket design which easily locks in either condition.

Still another object of this invention is to provide a fishing belt giving adequate support for a fishing rod and which distributes the load effectively upon the fisherman's body.

These objects are all achieved in accordance with this invention, one specific embodiment of which comprises a belt and pad with a unitary metal socket member secured centrally to the pad. The socket member includes a cup portion and a pin adapted to be locked across the cup portion or retracted away from the cup when the belt is used with medium tackle.

One feature of this invention relates to the presence of a retractible socket pin in a heavy tackle rod holder.

Another feature of the invention resides in the pin structure which is pivoted between two positions, one across the cup and the other against the pad and out of the way.

Still another features of this invention is the broad socket supporting pad contoured to distribute the load of the rod butt broadly across the abdomen of the wearer.

These and other features of this invention may be more clearly understood from the following detailed description and by reference to the drawing, in which:

FIG. 1 is a front elevational view of a fisherman's rod holder incorporating this invention;

FIG. 2 is a side sectional view of the rod holder of FIG. 1 taken along lines 2—2 of FIG. 1;

FIG. 3 is an enlarged fragmentary portion of the arrangement of FIG. 2, with the rod supporting pin shown locked in one position; and FIG. 4 is an enlarged fragmentary portion of the arrangement of FIG. 2, with the pin shown locked in the second position.

Referring now to FIG. 1, a fisherman's belt 10 carrying a kidney-shaped pad 11 may be seen with a rod butt socket assembly secured centrally to the pad 11. The belt is normally worn with the buckle, unshown in the drawing, at the side or in back and the pad 11 extending across the abdomen of the wearer. The pad 11 is of sufficient width that the pressure of a fishing rod butt in the socket 12 is well distributed across the wearer's midsection including the hip bones. The belt 10 passes through slots in pad 11 or alternatively may be riveted thereto.

The pad 11 is preferably made of leather and carries a resilient backing 13, for example of felt, sewn to the pad 11.

The control socket 12 is a unitary metallic piece having a flat base portion 14 and an inclined raised portion 15 defining a cup 16. Extending across the cup 16 is a pin 20 resting in a pair of slots 21 in the side walls of the cup 16. The pin 20 is preferably of stainless steel or other metal capable of withstanding the loading encountered in normal use. The pin 20 is supported at its ends by a pair of arms 22 and 23 which are pivotally secured to the sides of the raised portion 15 of the socket 12.

As shown in FIG. 1, the pin 20 extends across the cup 16 in position to support the butt of a heavy type fishing rod. The details of the pad and socket assembly are more apparent from FIG. 2. The socket 12 is secured to pad 11 by means of a number of screws 30, two of which are shown, and a backing plate 31 on the under side of pad 11.

In FIG. 2, the pin 20 and arm 23 are shown in an intermediate position as when the pin 20 is being moved from the slots 21 to the uppermost position of the cup region.

The condition of the socket for use with heavy tackle is shown in FIG. 3. There the handle 35 of the rod is shown in dashed lines with the spherical butt 36 shown positioned in the cup 16 with the pin 20 of the socket 12 resting in the diametrical slot 40 of butt 36. The pin 20 is locked securely in position in the slots 21 by the arms 22 and 23 bearing against a fillet portion 41 of the socket member 12.

The locking details of the invention insure that the pin 20 remains in the selected position either in the cup 16, as shown in FIG. 3, or out of the cup 16 and extending parallel to the base portion 14, as shown in FIG. 4. The pin 20 and arms 22 and 23 are pivoted about a pair of screws 42 and 43, best seen in FIG. 1 and positioned in threaded holes in the sides of the upstanding portion 15 of the socket 12 toward the top of the socket. The arms 22 and 23 have keyholes slots 44 through which the respective screw body 42 or 43 passes. The slots 21 of the socket body 12 are undercut so that the pin and arm assembly may slide relative to the socket body 12 when in the position shown in FIG. 3. When slid to the lower position, the arms 22 and 23 may be pivoted and the pin 20 withdrawn from the slot 21. When slid to the uppermost position the pin 20 is held in the undercut portion of slot 21 and the arms 22 and 23 bear against the fillet 41, effectively locking the arm and pin assembly rigidly. The belt and socket may then be used for heavy tackle. The normal pressure of the butt against the pin 20 tends to hold the pin and arm assembly in the locked position.

Whenever it is desired to use the belt and socket for lighter tackle with a conventional rod butt, the pin and arm assembly is unlocked by sliding it downward and outward and pivoting it upward to the position shown in FIG. 4. In FIG. 4 a conventional rod butt 50 is shown positioned in the cup 16 resting against the walls of the cup. Arms 22 and 23 both bear against fillet surfaces 41 and 51 and are thereby locked in the uppermost position when the arms 22 and 23 are slid downward as shown in FIG. 4. Arms 22 and 23 are thereby locked in this second position with the arm and pin assembly out of the way.

In accordance with this invention a universal fishing rod supporting belt is provided which may be rapidly shifted from use with heavy to medium or light tackle without necessitating the removal of parts. Moreover, the dual arrangement is simple, effective, and designed to lock in either condition. Further in accordance with this invention the load of the fishing rod butt is effectively distributed over the abdomen of the wearer to minimize strain or discomfort.

Although there has been described above a specific arrangement of a fisherman's belt in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A universal fishing rod socket and belt comprising a belt to be worn about the abdominal region of a fisherman, a pad carried by said belt, and socket means secured to said pad, said socket means including a body portion defining a recess having an axis inclined outward from the wearer and a pair of slots on opposite sides of the recess, a pair of arms pivoted about said body portion on opposite sides of said recess, a pin connecting the unrestrained ends of said arms, the pin and arm assembly positioned for rotational movement to one position with said pin extending across the recess in said slots and to a second position remote from the recess.

2. The combination in accordance with claim 1 wherein the slots in the body portion include a re-entrant portion and the pin and arm assembly is slidable to a third position with said pin secured within the re-entrant portion.

3. The combination in accordance with claim 2 wherein the body portion includes a fillet bearing against said arms when the pin and arm assembly is moved to said third position whereby the assembly is restrained from rotation.

4. The combination in accordance with claim 1 wherein the body portion includes a fillet bearing against said arms when the pin and arm assembly is in said second position for holding said assembly therein.

References Cited in the file of this patent

UNITED STATES PATENTS

| | | |
|---|---|---|
| 1,451,732 | Hipwood | Apr. 17, 1923 |
| 1,985,985 | Gerline | Jan. 1, 1935 |
| 2,298,694 | Haislip | Oct. 13, 1942 |